United States Patent [19]

Spangler

[11] Patent Number: 5,702,516

[45] Date of Patent: Dec. 30, 1997

[54] METHOD OF USING WATER SOLUBLE FOAMED STARCH FOR RECLAIMING PAINT OVER-SPRAY PARTICLES

[75] Inventor: John M. Spangler, Peoria, Ill.

[73] Assignee: Caterpillar Inc., Peoria, Ill.

[21] Appl. No.: 768,825

[22] Filed: Dec. 17, 1996

[51] Int. Cl.$^6$ .................. C09D 201/00; B01D 39/16; B01D 46/10

[52] U.S. Cl. .................. 106/287.35; 134/38; 55/243; 55/428; 55/522

[58] Field of Search .................. 106/287.35; 134/38; 55/243, 428, 522

[56] References Cited

U.S. PATENT DOCUMENTS 3,616,603 11/1971 Warner .................................. 55/97

Primary Examiner—David Brunsman
Attorney, Agent, or Firm—Pankaj M. Khosla

[57] ABSTRACT

A method of using water soluble foamed starch for reclaiming paint overspray particles from air includes the steps of passing a stream of air containing paint overspray particles through an air filter assembly having a filtration element. The filtration element consists essentially of water soluble foamed starch. The paint overspray particles are collected on the filtration element. The filtration element containing the collected paint overspray particles is deposited in a vessel containing water. The filtration element is dissolved in the water and an aqueous solution of starch in water is formed. The paint overspray particles are separated from the aqueous solution of starch dissolved in water.

9 Claims, 3 Drawing Sheets

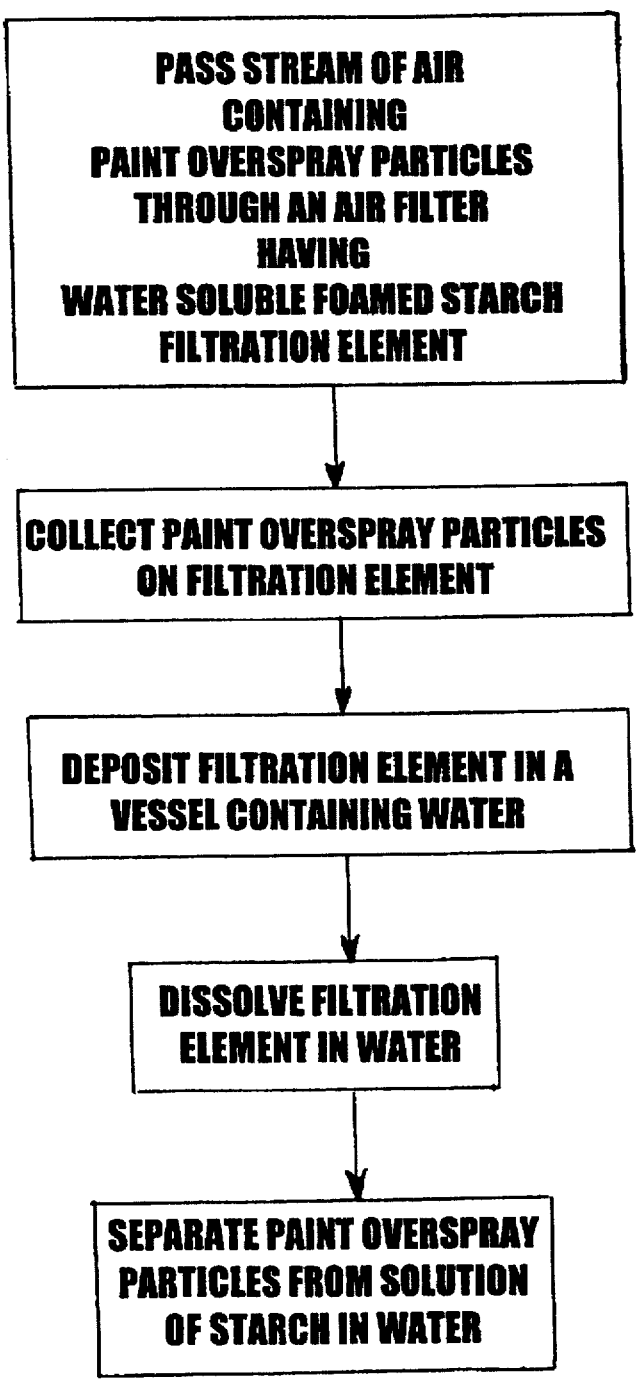

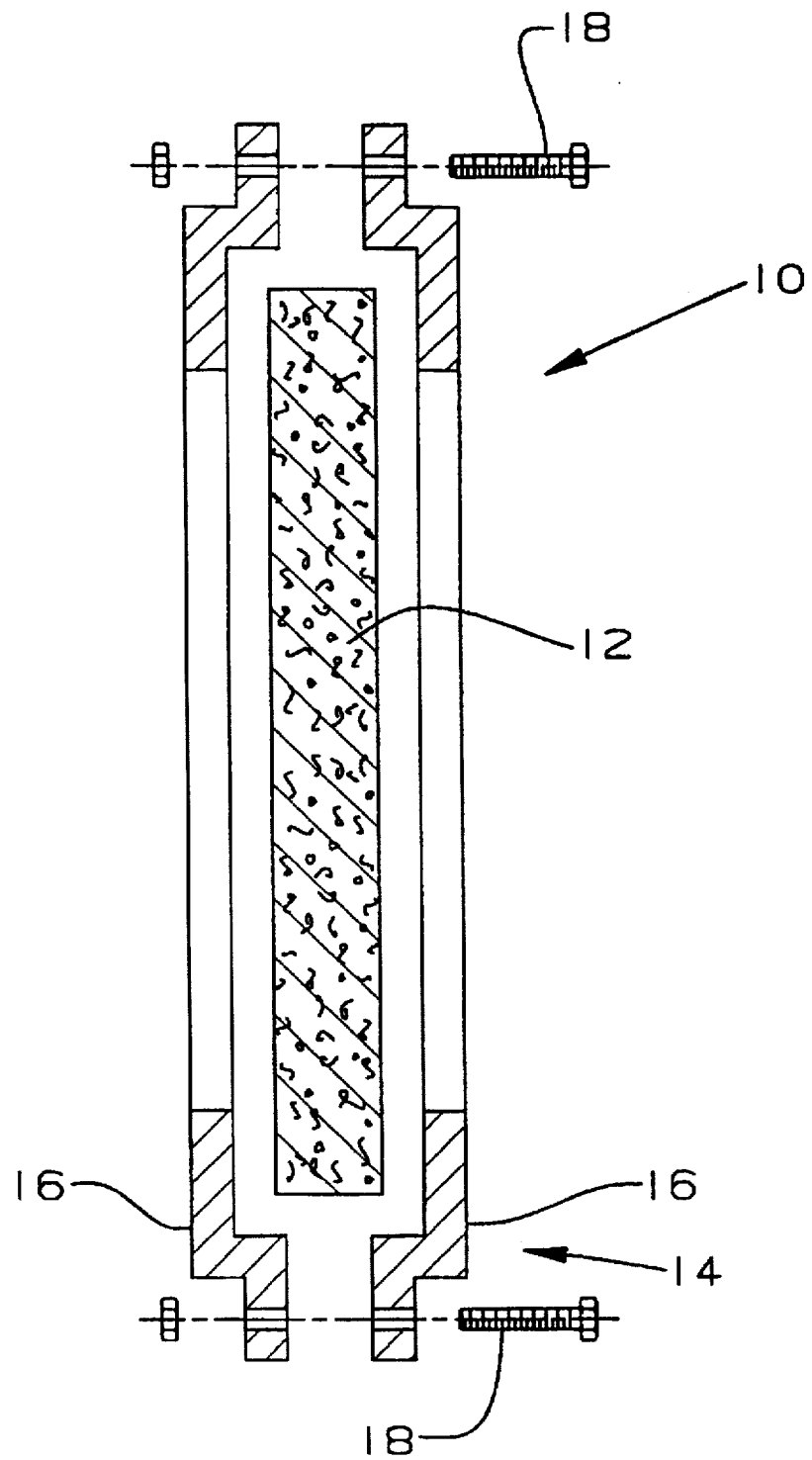

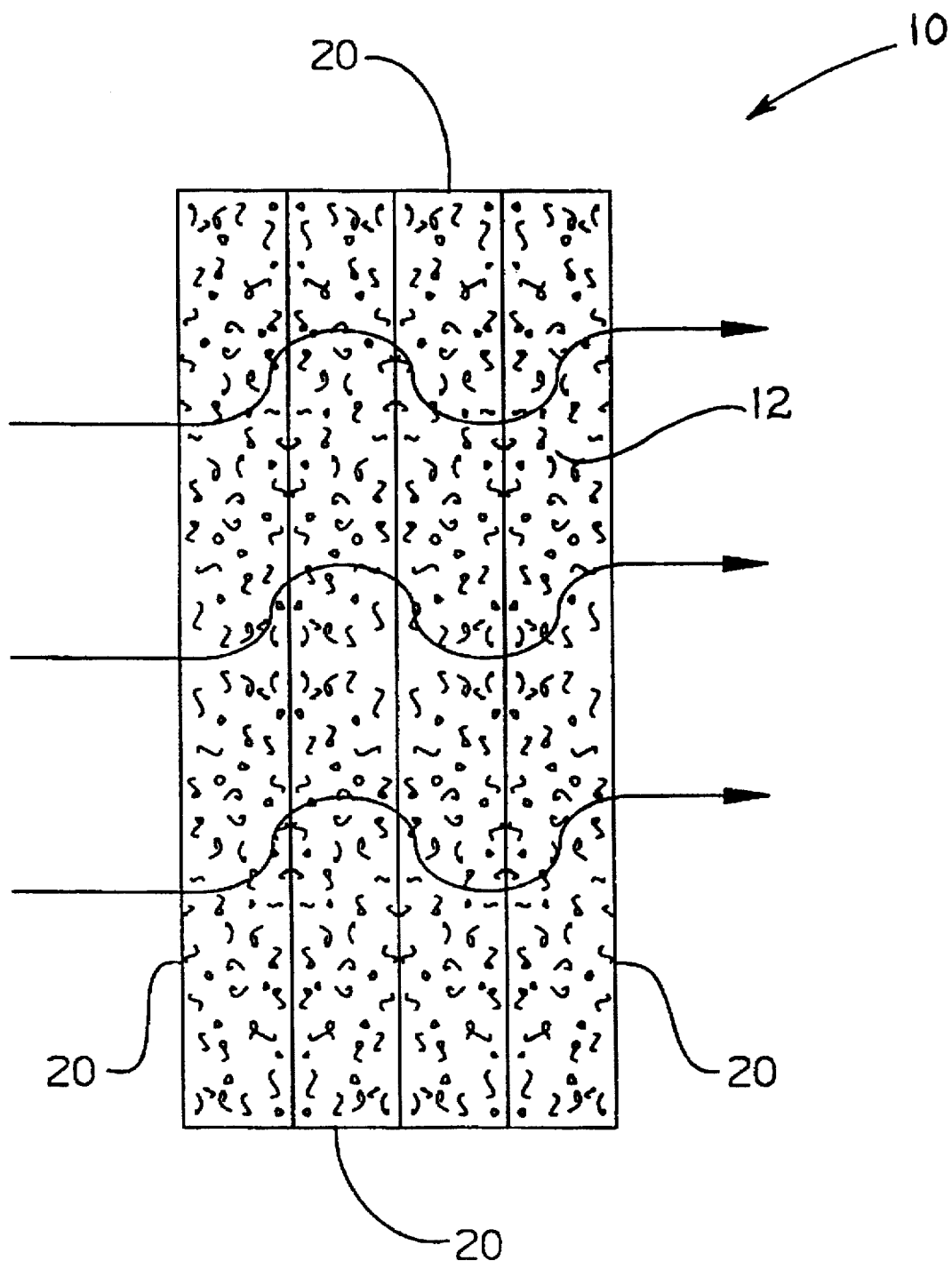
Fig_3_

5,702,516

METHOD OF USING WATER SOLUBLE FOAMED STARCH FOR RECLAIMING PAINT OVER-SPRAY PARTICLES

TECHNICAL FIELD

This invention relates generally to a method of using water soluble foamed starch as a disposable air filter, and particularly to a method of using water soluble foamed starch for reclaiming paint overspray particles from air.

BACKGROUND ART

Various methods for reclaiming paint overspray from paint spray booths employ the use of disposable air filters. One method for recovering paint overspray articles in a baffle-type filter arrangement is disclosed in U.S. Pat. No. 4,193,777 issued Mar. 18, 1980 to François-Xavier J. de la Riviere. The de la Riviere baffle plates are coated with a thermally meltable coating, such paraffin or other wax. After becoming coated with the overspray particles, the coated baffle is heated to a temperature above the melting point of the coating, and the paint saturated coating is removed from the baffle.

Air filters employed for filtering the air exhausted from spray paint booths typically have a filtration element formed of plastic foam, spun fiberglass or polyester, or other such disposable filtration media. When such filters become ineffective after a period of use, the filtration element containing entrapped paint particles is removed and replaced with a new element. Disposing of used filtration elements is a problem because of the entrapped paint particles, which may contain compounds that are classified as being environmentally undesirable and/or hazardous. It is thus desirable to have an air filter and/or a method by which the entrapped paint particles can be reclaimed for later use.

A decomposable filter having a filter media formed of a water soluble material is disclosed in U.S. Pat. No. 3,616,603, issued Nov. 2, 1971 to John Glenn Warner. The water soluble filtration materials proposed for use by Warner consist of two synthetic polymers and four chemically modified cellulose derivatives.

It is desirable to have a method of using a readily water soluble decomposable air filtration media to reclaim paint overspray particles by trapping and holding paint overspray particles on the filtration media. It is desirable to have a method of using a readily water soluble air filtration media that will permit separation and reclamation of the entrapped paint without requiring additional treatment to separate wax, polymer compounds or other undesirable filter-related materials from the paint particles. It is also desirable to have a method for paint reclamation wherein the air filtration element is biodegradable and can be disposed off in an environmentally non-hazardous manner. It is finally desirable that the filtration element be readily soluble in water without any additional chemical modification of the filter to make it water soluble, thus resulting in a savings of labor, materials and resources.

The filtration element of the air filter used in the method embodying the present invention is readily soluble in water, thereby permitting the separation and subsequent reclamation of paint particles collected by the filter.

The present invention is directed to overcoming the problems set forth above.

DISCLOSURE OF THE INVENTION

In one aspect of the present invention, a method of using water soluble foamed starch for reclaiming paint overspray particles from air is disclosed. In the steps comprising this method, a stream of air containing paint overspray particles is passed through an air filter assembly having a filtration element. The filtration element consists essentially of water soluble foamed starch. The paint overspray particles are collected on the filtration element. The filtration element containing the collected paint overspray particles is deposited in a vessel containing water. The filtration element is dissolved in the water and an aqueous solution of starch in water is formed. The paint overspray particles are separated from the aqueous solution of starch dissolved in water.

BRIEF DESCRIPTION OF THE DRAWINGS

FIG. 1 is a schematic flow diagram representing the method of the present invention;

FIG. 2 is an exploded sectional view of an air filter assembly using water soluble foamed starch as an air filtration element, according to one embodiment of the method of the present invention; and FIG. 3 is a diagrammatic cross-sectional view of a baffle-type air filter using water soluble foamed starch as an air filtration element according to another embodiment of the method of the present invention.

BEST MODE FOR CARRYING OUT THE INVENTION

In the preferred embodiment of the present invention, as shown in FIG. 1, the method of using water soluble foamed starch for reclaiming paint overspray particles from air includes the step of passing a stream of air containing paint overspray particles through an air filter assembly having a filtration element consisting essentially of water soluble foamed starch. The paint overspray particles are collected on the filtration element. The filtration element containing the collected paint overspray particles is deposited in a vessel containing water. The filtration element is dissolved in the water and an aqueous solution of starch in water is formed. The paint overspray particles are separated from the aqueous solution of starch dissolved in water.

Referring now to FIG. 2, which shows an air filter assembly 10 for carrying out the preferred embodiment of the method of the present invention, the air filter assembly 10 includes a filtration element 12 and a holder or support structure 14. Preferably, the support structure 14 is capable of being separated from the filtration element 12 and reused. As shown in FIG. 2, the support structure 14 includes a pair of frame members 16 that are secured together in a fixed relationship by fastening means, such as bolts 18. Alternatively, the frame members may be constructed so that they snap together and are held in fixed relationship by a clamp element or by an interference fit between contacting elements of the frame members.

Further, support structure 14 may be an integral portion of a larger structure, such as a wall rack of a paint spray booth. For example, filtration element 12 may be removably retained in place by large open mesh screens, or by slots in side rails of a filter holder, or by a combination of the above described support arrangements.

The filter assembly for carrying out the method embodying the present invention may also include one or more pre-filtration elements or screens. Pre-filtration elements may be conveniently formed of a more open cell form of the same material as that in the primary filtration element 12.

In the present invention, it is desirable that the filtration element 12 be formed of a material that is biodegradable, and it is essential that it be readily soluble in water. The term "readily soluble" as used herein with respect to material properties, means a material that is capable of being dissolved in water, at room temperature, and assisted only by stirring or agitation, at a rate such that at least 90% of the material by volume, will be dissolved in the water and form a substantially uniform aqueous solution therewith, in a period of time less than 1 hour. Generally, readily soluble materials such as the porous water soluble foamed starch materials described below with respect to the preferred embodiment of the present invention, dissolve in water in a few seconds or, at the most, in less than 1 minute. The non-porous water soluble foamed starch materials proposed for use in an alternate embodiment of the present invention may require up to about 10 minutes to dissolve in water at room temperature.

It has been found that soluble foamed starch is particularly suitable for the formation of the filtration element in the method of the present invention. The term "soluble starch" is used herein in its commonly understood meaning, which is defined in the McGraw-Hill Dictionary of Scientific and Technical Terms, fifth edition, as being "A group of water-soluble polymers formed from starch, such as the starches derived from corn or potato, by acetylation, acid hydrolysis, chlorination, or by action of enzymes to form starch acetates, ethers, and esters; used as textile sizing agents, emulsifying agents, and paper coatings."

Examples of such material include either plates or sheets of a foamed, gelatinized starch product such as starch product described in PCT publication No. WO 83/02955. The foamed starch described in the PCT publication is an open cell material useful in various applications such as foam sheets or fillers for packing. Another example of a material suitable for use in the formation of the filtration element 12 for the method of using foamed starch embodying the present invention, is an open cell form of the high amylose starch material described in U.S. Pat. No. 5,153,037 issued Oct. 6, 1992 to Paul A. Altieri. The Altieri starch material is an expanded starch product and is proposed for use as a packaging material in the '037 patent. Both of the above described starch products are readily soluble in water and are biodegradable, thereby avoiding ecological problems attributable to the filtration material.

Further materials suitable for the method of using water soluble foamed starch as an air filtration element to filter paint particles from air are starch fibers that may be woven or spun in layers to form an element similar to the familiar spun fiberglass household filters.

Desirably, in the preferred embodiment of the present invention, the filtration element 12 should be sufficiently porous so that there is not an excessive drop in air pressure across the filter, and should have a pore size sufficient to effectively trap a predetermined minimum diameter paint particle. Typically, the pores may range from about 0.3 µm to 10 µm in size. For this reason, the surface of the filtration element should contain from about 5 to about 200 pores per square inch of the surface area and have a thickness sufficient to trap the airborne particles without causing an undesirable drop in air pressure, i.e., without unduly inhibiting the flow of air, across the filter.

Preferably, the material comprising the porous filtration element 12 is chemically unmodified water soluble foamed starch. Foamed, or expanded, starch is readily soluble in water at room temperature, whether it be chemically modified or not. The purpose for chemically modifying starch, such as by the processes mentioned above in the McGraw-Hill cited definition, is to disrupt some of the crystallinity within the starch granule while keeping the granule intact. This disruption facilitates water penetration into the granule. However, when starch is foamed, such as by extrusion expansion, the granule form of starch is totally disrupted and thereby rendered readily soluble. In the extrusion expansion process, a small amount of water, typically from about 15% to 20%, is added to starch powder, mixed, pressurized, and conveyed within an extruder to a discharge nozzle, whereat the pressurized mixture expands upon expulsion from the nozzle. It is therefore desirable that all embodiments of the present invention be formed of foamed starch, whether it be chemically modified or not. Also, depending on the particular embodiment, the foamed starch may have either a porous, interconnecting open cell or nonporous closed cell structure.

If the filter of the method embodying the present invention is to be used in high humidity environments, is desirable to blend a small amount of a hydrophobic agent such as fumed silica with the starch, forming a blended mixture that does not chemically modify the starch. For example, about 0.25% fumed hydrophobic silica may be blended with the starch prior to foaming to provide hydrophobic properties in the filter.

It may also be desirable to have one or more pre-filtration elements in the filter assembly 10 to trap larger particles and debris prior to the overspray laden air stream passing through the primary filtration element. In such an arrangement, the first filter, i.e., the filtration element 12 that is first encountered by the air stream will have relatively large pores and serve as a pre-filter. Hence, it can be seen that the thickness of the filtration element is dependent upon the total surface area of the filter assembly, the porosity of either a single, or if pre-filtration elements are included, a plurality of filtration elements, and the airflow requirements of the spray booth.

Referring now to FIG. 3, in an alternative embodiment of the present invention, the filtration element 12 is made from water soluble foamed starch that is formed into elongated baffle plates 20 that are arranged to form a circuitous, or labyrinthine air flow path for a particle-laden stream of air. In this arrangement, the particulate material borne by the air stream is deposited on the surface of the baffle plates 20 as the air changes its direction of flow. Therefore, in this filter arrangement, it is not necessary that the water soluble foamed starch element be porous because the capture of the paint particles from the air is not dependent upon the air flow through the element 12, but rather, by impingement upon the surface of the element 12.

In either arrangement, the air filter assembly 10 has the conventional entrance and exit sides. In the preferred embodiment, the filtration element 12, is formed of a porous, water soluble foamed starch. In the above described alternate embodiment, the filtration element 12 may, if desired, be made of non-porous water soluble foamed starch. In either arrangement, the filtration element 12 consists essentially of only water soluble foamed starch.

Importantly, the water solubility of the foamed starch filter permits uncomplicated separation of paint overspray particles collected on the surface or within the pores of the filter without requiring any additional chemical modification of the filter. Separation of the collected paint particles from the filtration element may be easily accomplished by simply depositing the filtration element 12 containing entrapped paint particles, in a vessel containing water.

If desired, an alkali such as sodium hydroxide or potassium hydroxide may be added to the water bath, in an amount sufficient to provide a pH of at least 8.5, to enhance the solubility of the foamed starch filtration element. Alternatively, for the same reason, the water bath may be heated to a temperature above about 120° F. (≈50° C.), either independently or concurrently with the addition of an alkali. Oxidation agents may also be used to further enhance the favorable solubility characteristics of foamed starch in water. For example, starch is readily oxidized by hydrogen peroxide or chlorine dioxide, resulting in degradation of the starch chains to low molecular weight, highly soluble fragments. Also, the solubility of foamed starch in water may be enhanced by ozonation. Combinations of alkaline compounds, oxidizing agents, or ozonation treatment, either with or without heating, may also be highly efficient in achieving release of the paint particles filtered from the air stream passing through, or impinged upon the surface of, the foamed starch filtration element.

After the filtration element 12 is dissolved, the paint particles can be removed by mechanical separation, such as centrifugation, filtration, skimming or decantation.

After separation, the separated paint particles are desirably processed to produce a quality reclaimed paint or other recycled product. Preferably, the separated paint particles are washed in clear water to remove any remaining starch, and then again filtered prior to drying the paint particles to less than about 1% by weight moisture content. Methods for processing the separated paint particles are disclosed in U.S. Pat. No. 5,092,928 issued Mar. 3, 1992 to the inventor of the subject invention and titled "Process for Recovering Paint Overspray Particles" and in co-pending U.S. application Ser. No. 08/522,055 titled "A Process for Reclaiming Paint and a Paint Formulation", filed by the inventor of the subject invention. The dried paint particles are then pulverized to less than 20 microns. The ground particles may then be used, as described in the above referenced patent and co-pending application, to form a high quality recycled paint product or a cost effective additive for a paint formulation.

INDUSTRIAL APPLICABILITY

The air filter assembly 10, embodying the method of using water soluble foamed starch of the present invention, is particularly useful in collecting paint overspray particles entrained in the air exhausted from spray paint booths. The collected particles are easily separated from the filtration element 12 by dissolution of the foamed starch filtration element in water or another suitable solvent. In the preferred embodiment of the present invention, the filtration element 12 is formed of a porous water soluble foamed starch material. In this embodiment, the paint particles entrapped by the filtration element 12 are separated by dissolving the element in water. The dissolved starch is biodegradable and does not pose any known environmental safety problems.

After separation, the paint particles may be processed to form the base for a high quality recycled paint product, or for other uses such as in floor blocks.

Other aspects, objects and advantages of this invention can be obtained from a study of the drawings, the disclosure, and the appended claims.

I claim:

1. A method of using water soluble foamed starch for reclaiming paint overspray particles from air, comprising the steps of:

passing a stream of air containing paint overspray particles through an air filter assembly having a filtration element, said filtration element consisting essentially of water soluble foamed starch;

collecting said paint overspray particles on said filtration element;

depositing said filtration element containing said collected paint overspray particles in a vessel containing water;

dissolving said filtration element in said water and forming an aqueous solution of starch in water; and separating said paint overspray particles from said aqueous solution of starch dissolved in water.

2. A method of using water soluble foamed starch, as set forth in claim 1, wherein subsequent to separating said paint overspray particles from the aqueous solution of starch dissolved in water, the separated paint particles are pulverized and used as a base to form a recycled paint product.

3. A method of using water soluble foamed starch, as set forth in claim 1, wherein said step of dissolving said filtration element in water includes at least one of heating said water, adding an alkaline composition to said water, adding an oxidizing agent to said water, and ozonation.

4. A method of using water soluble foamed starch, as set forth in claim 1, wherein subsequent to separating said paint overspray particles from the aqueous solution of starch dissolved in water, said method further comprises the steps of:

washing the separated paint particles to remove substantially all starch from the particles;

filtering the washed paint particles;

drying the filtered paint particles to less than 1% moisture content;

pulverizing the dried paint particles to a nominal size less than 20 microns; and blending said pulverized paint particles with binder, solvent and other materials sufficient to form a paint composition.

5. A method of using water soluble foamed starch, as set forth in claim 1, wherein said filtration element consists essentially of at least about 99% water soluble foamed starch and no more than about 1% of a hydrophobic agent.

6. A method of using water soluble foamed starch, as set forth in claim 5, wherein said hydrophobic agent is hydrophobic silica.

7. A method of using water soluble foamed starch, as set forth in claim 5, wherein said water soluble foamed starch is chemically unmodified.

8. A method of using water soluble foamed starch, as set forth in claim 5, wherein said water soluble foamed starch has a porous interconnecting open cell structure capable of trapping paint particles carried by a stream of air passing through said filtration element.

9. A method of using water soluble foamed starch, as set forth in claim 5, wherein said water soluble foamed starch has a nonporous closed cell structure capable of trapping paint particles carried by a stream of air impinging upon the surface of the filtration element.

\* \* \* \* \*